US006117264A

United States Patent [19]

Brewster

[11] Patent Number: 6,117,264

[45] Date of Patent: Sep. 12, 2000

[54] COLOR CODED WARNING LABEL WITH REMOVABLE COATING

[76] Inventor: Blair Meloy Brewster, 297 Henry St., Brooklyn, N.Y. 11201

[21] Appl. No.: 09/040,771

[22] Filed: Mar. 18, 1998

Related U.S. Application Data

[62] Division of application No. 08/608,797, Feb. 29, 1996, Pat. No. 5,773,111.

[51] Int. Cl.$^7$ .............................. B32B 31/12; G09F 3/00

[52] U.S. Cl. .......................... 156/249; 156/277; 156/278; 156/289; 428/40.1; 283/81

[58] Field of Search .................................... 156/277, 278, 156/249, 289; 428/40.1, 299; 283/81, 101

[56] References Cited

U.S. PATENT DOCUMENTS

| | | | |
|---|---|---|---|
| 3,153,868 | 10/1964 | Jones . | |
| 4,180,929 | 1/1980 | Schultz, Jr. . | |
| 4,630,844 | 12/1986 | Troy et al. . | |
| 4,640,030 | 2/1987 | Wood et al. . | |
| 4,742,954 | 5/1988 | Shishido . | |
| 4,752,087 | 6/1988 | Weisbach . | |
| 4,881,758 | 11/1989 | Ben-David . | |
| 4,939,674 | 7/1990 | Price et al. . | |
| 5,207,746 | 5/1993 | Jones . | |
| 5,243,173 | 9/1993 | Dunn . | |
| 5,284,363 | 2/1994 | Gartner et al. . | |
| 5,395,137 | 3/1995 | Kim . | |
| 5,439,721 | 8/1995 | Pedroli et al. . | |
| 5,449,202 | 9/1995 | Nalepka et al. . | |
| 5,773,111 | 6/1998 | Brewster | 428/40.1 |

*Primary Examiner*—Curtis Mayes
*Attorney, Agent, or Firm*—Harter, Secrest & Emery LLP; Stephen B. Salai, Esq.; Brian B. Shaw, Esq.

[57] ABSTRACT

A color coded warning label in which the color code has a removable opaque coating and the label is provided with a self-laminating flap for protecting the removable coating prior to use and for making the code permanent during use is described. A method for using the color coded label to quantify the level of a hazard is also described.

7 Claims, 3 Drawing Sheets

COLOR CODED WARNING LABEL WITH REMOVABLE COATING

This is a divisional of application Ser. No. 08/608,797 filed Feb 29, 1996, now U.S. Pat. No. 5,773,111.

FIELD OF THE INVENTION

This invention relates generally to a color coded warning label and in particular to a warning label in which the color code has a removable opaque coating and the label is provided with a self-laminating flap for protecting the removable coating prior to use and for making the code permanent during use. A method for using the color code to quantify the level of a hazard is also described.

BACKGROUND OF THE INVENTION

New regulatory requirements emphasize the need to warn employees of the effects of hazardous chemicals. The regulations require that virtually all chemical containers and/or locations where they are being used be provided with visual warnings that clearly identify the chemical and indicate the potential hazards associated with its use. Relevant information relates to health, flammability and reactivity hazards associated with the chemical and an index for assessing the degree of danger for each hazard. The warning on a label should be clearly visible, legible and capable of rapid assessment by the user. The label should be resistant to the environment and to tampering.

The National Fire Protection Agency (NFPA) diamond is a standardized symbol which is widely used to indicate hazards associated with a chemical. The symbol is a vehicle for presenting information on health, flammability, reactivity and special hazards and the degree of the hazard on a scale of 0–4. The diamond shaped symbol has four quadrants, each of which relates to one of the hazards. Three of the quadrants have a different color with an index number superimposed on the color to indicate the degree of hazard. The fourth quadrant is reserved for a symbol to indicate the special hazard. Here to fore the labels have generally been preprinted and applied by the chemical manufacturer at the source of the chemical packaging. Such a system does not lend itself to customization of the label. Such a system provides immediacy, but at some sacrifice of adequacy. It depends on extensive training of individuals on interpretation of the code and suffers from a lack of accuracy, poor understandability, poor response time, lack of effectiveness, and a frequent need to check other sources, such as, a material safety data sheet (MSDS) for additional information.

Labels have been developed for non-hazardous purposes in which some or all of the information on the label is coated with an opaque material to temporarily obscure selected information. The opaque material can be removed by the user to reveal the information which is then interpreted. A problem with removable coatings is that they are not weather resistant and are susceptible to unintentional abrasion which can lead to erroneous or confusing indications and inaccurate interpretation of the indicia or code. In general, this makes them unsuitable for use with warning labels in industry or in severe environmental conditions.

U.S. Pat. No. 5,395,137 (Kim) discloses a color coded label for use in classifying and identifying documents in document handling systems. The label includes a base member in the form of a thin plate and a color code coated on the surface of the base member. The color code is in the form of multiple bands of different colors which are coated with an opaque or semi-transparent material. The opaque coating can be a screen ink which can be partially or completely removed by scraping from one or more bands to expose a pattern of colored bands. The exposed band or pattern of bands corresponds to a predetermined classification or identification. In a preferred embodiment the color code is coated with a transparent plastic coating between the color code and the screen ink coating to protect the color code itself from scraping. There is no disclosure of a transparent plastic cover over the opaque coating to protect the opaque coating prior to use of the label or after the code is set. This color coded system relies on a colored band or combinations of different colored bands to provide specific identification information. There is no disclosure of exposing selected portions of a single colored band to provide quantitative information.

It is an object of this invention to provide a color coded warning label with a removable opaque coating over the color code, in which the removable coating and code are protected before and after the warning code is set.

It is an object of this invention to provide a color code which provides quantitative hazard information and is accurate, easy to use and readily interpreted.

SUMMARY OF THE INVENTION

Briefly stated this invention provides a color coded self-laminating warning label for indicating a degree of hazard to a user comprising a substrate having a surface for receiving indicia thereon; a color code printed on a portion of the surface; a removable , opaque coating layer over the color coded portion, wherein the opaque coating layer can be at least partly selectively removed to indicate the degree of hazard according to a predetermined hazard index; a sheet of clear material overlying the receiving surface and attached to the substrate at a first end and free from the substrate at a second end, the second end overlying the indicia receiving surface of the substrate; a layer of adhesive material on the sheet of clear material; and a removable protective liner covering the adhesive layer on the second end of the clear material ; whereby the sheet of clear material with the protective liner in place protects the opaque coating layer from unintentional erasure and whereby upon removal of the protective liner, the sheet of clear material forms a laminate with the substrate to render the color code and the indicia permanent.

In another aspect of the invention there is provided a method of indicating a level of hazard to a user, comprising imprinting a label having a surface for receiving printing thereon with a color code, the code being divided into a plurality of segments; coating the color code with a removable opaque layer; and removing the opaque coating layer from at least one segment of the color code to expose the segment, wherein the number of exposed segments indicates the level of the hazard according to a predetermined hazard index.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying figures.

DETAILED DESCRIPTION OF THE INVENTION

Figure 1:
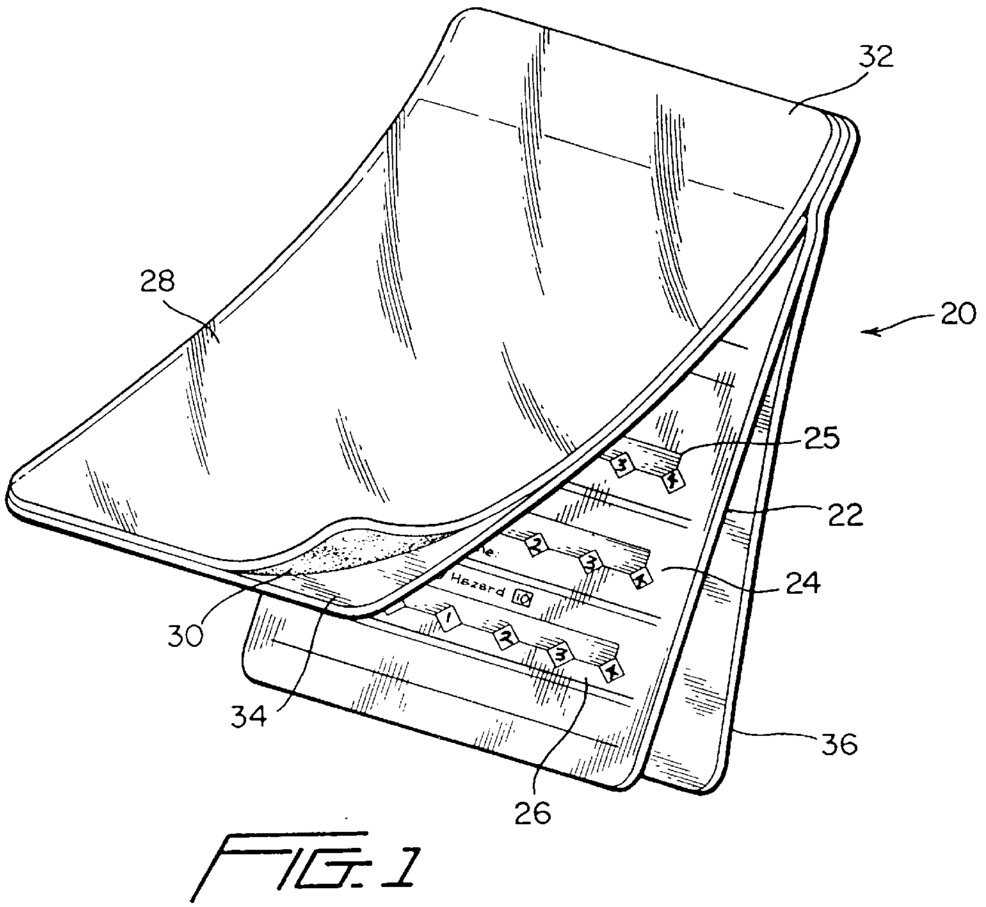
FIG. 1 is a perspective view of a warning label before lamination, partially open.
Figure 2:
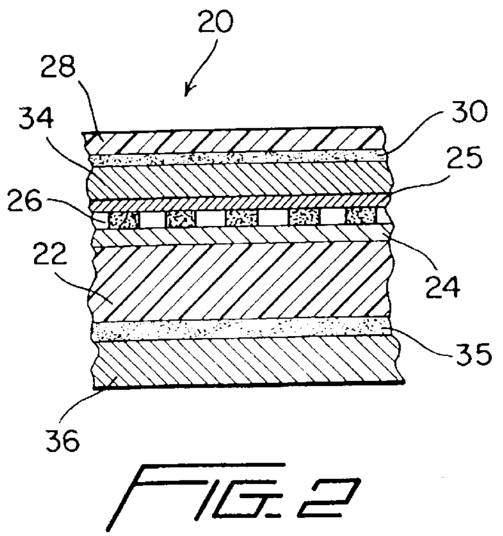
FIG. 2 is a cross section view of the layered structure of FIG. 1.

Referring to FIGS. 1 and 2, there is shown a warning label 20 of the invention. The label includes a substrate 22 with a surface 24 for receiving printed and/or written indicia 26. The indicia 26 can be alpha numeric indicia or symbols which provide a visual warning and/or instructions to the user. The indicia on the surface may be in color and includes a color coded bar with a removable opaque coating 25. The coating is preferably coextensive with or slightly longer than the color coded bar. Removal of a portion of the opaque coating sets a code which is described in more detail below.

The substrate material may be of relatively thick paper or plastic, for example, vinyl or polyester plastic. The surface of the substrate can be, at least partly, coated with a receiving layer for receiving images or instructions in more legible form. The coated surface can have a pencil receptive surface, a toner receiving layer or a combination of both.

A sheet of clear material 28 having an inner surface coated with a pressure sensitive adhesive layer 30 is adhesively attached to the substrate at one end 32 and the remaining inner surface of the sheet is covered with a removable protective liner 34. The sheet of clear material 28 is a plastic sheet or film such as a vinyl or a polyester film or a sheet of UV resistant clear material for example, polyvinyl fluoride. The film can have a shiny or gloss finish or an anti-glare matte finish.

The adhesive layer 30 is chosen from any commercially available translucent or transparent pressure sensitive adhesive suitable for bonding the aforementioned plastics to the substrate, for example, an acrylic adhesive.

The protective liner 34 is made of a material which is stiff enough so that it is readily peeled from the adhesive coated sheet. A suitable liner is a paper liner of about 6 mils (0.15 mm) thickness which is provided with a silicone release coating to aid removal from the clear plastic sheet.

The label is preferably provided with an adhesive layer 35 and a removable backing 36 on the back of the substrate 26. Removal of the backing 36 allows the label to be adhesively attached to the surface of a container for which the warning on the label is directed.

The sheet 28 with the protective liner intact serves to protect the removable coating from accidental abrasion during handling before the code is set. After the code is set, removal of the liner 34 and pressing the sheet of clear material 28 onto the surface of the substrate forms a laminate and renders the code and indicia permanent. The laminate also protects the unerased portion of the opaque coating and the indicia on the substrate from the environment.

Figure 3:
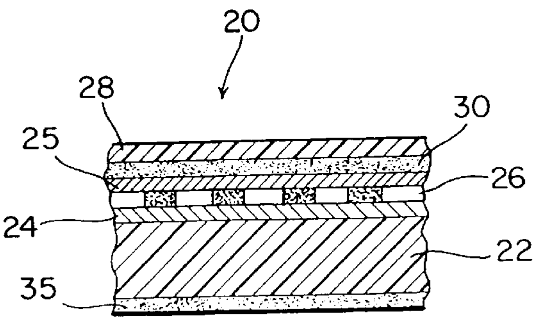
FIG. 3 is a cross section view of the layered structure of FIG. 1 after lamination.

Referring to FIG. 3 there is shown the layered structure of the label of FIG. 1 after lamination and removal of the backer. The clear plastic sheet 28 is laminated by means of the adhesive 30 over the remaining opaque coating 25 and the indicia 26 which are imprinted on the receiving layer 24, the receiving layer being coated on the polyester substrate 22. The adhesive layer 35 on the back of the substrate adheres the laminated label to a container.

Figure 4:
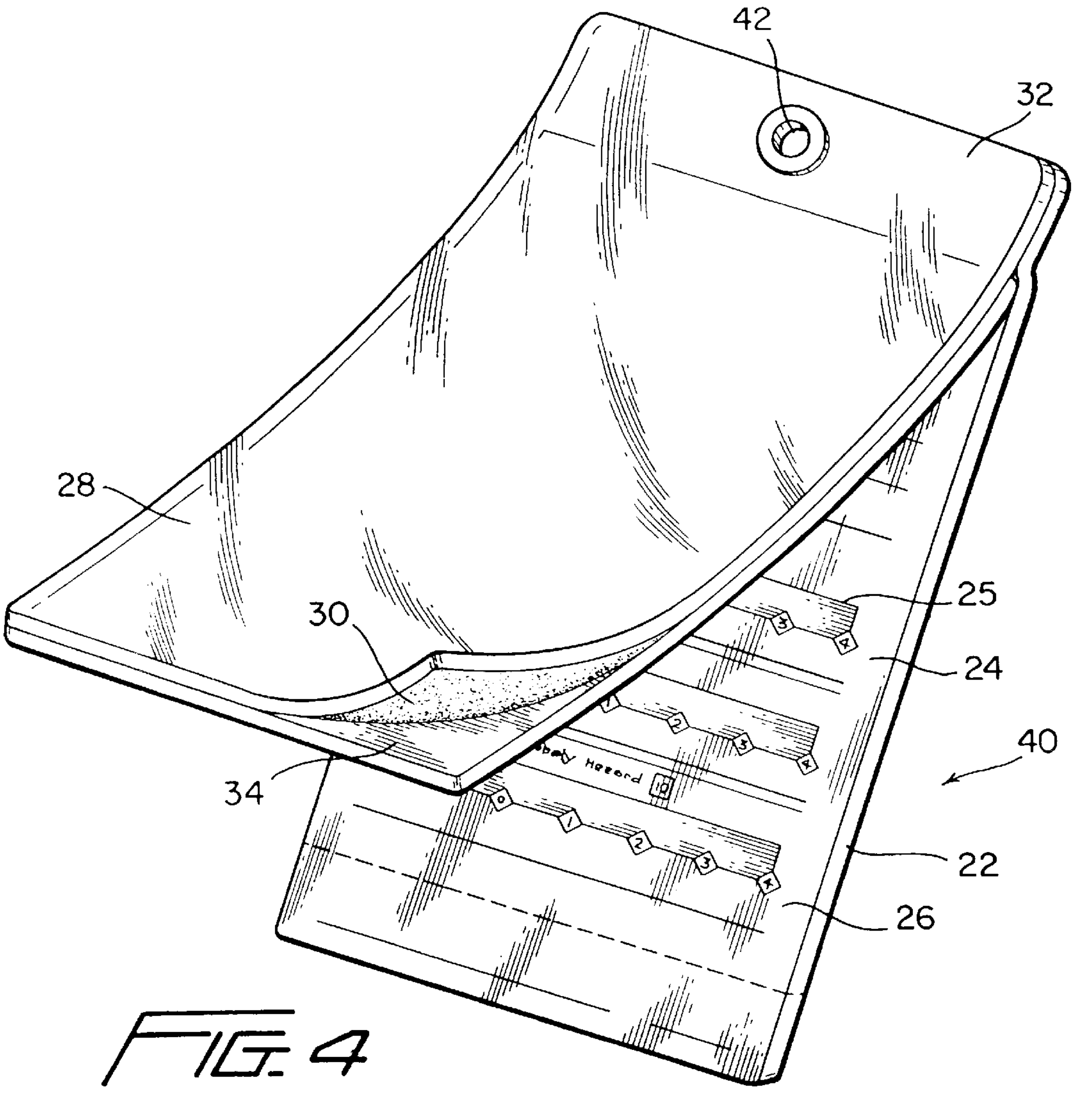
FIG. 4 is a perspective view of second embodiment of a warning label before lamination, partially open.
Figure 5:
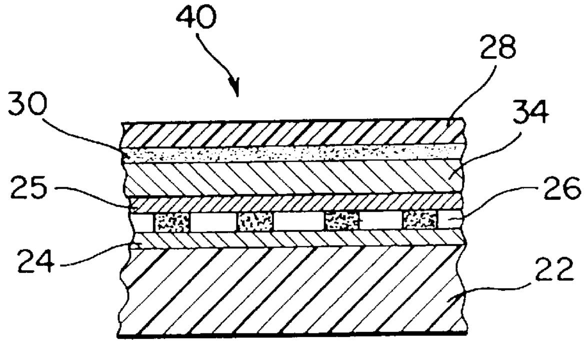
FIG. 5 is a cross section view of the layered structure of FIG. 4

Referring to FIGS. 4 and 5, another embodiment 40 of the warning label of the invention is shown. In this embodiment the label 40 can include the same substrate 22, the same sheet of clear material 28 with the pressure sensitive adhesive 30 and a removable liner 34 as described for the embodiment of FIG. 1 above. This embodiment lacks the removable backing and instead is provided with a mounting hole 42 at the end 32 of the label. In a preferred embodiment a reinforcer 44 is mounted in the mounting hole for receiving a fastener. The reinforcer can, either alone, or together with an adhesive layer secure the substrate 22 to the sheet 28. The label can then be attached to a container by means of the fastener. Suitable reinforcers include eyelets, rivets and grommets, especially plastic grommets. After lamination the layered structure of this label is the same as that shown in FIG. 3, absent the adhesive layer 35.

In one embodiment of the label the substrate is of a strong and tear resistant polyester coated with a receiving layer and provided with printed instructions and/or graphics on the receiving layer. The substrate is usually from 2 to 15 mils thick, preferably from 3 to 4 mils thick. These printed instructions and/or graphics are produced in black or any suitable color or pattern of colors on the receiving layer by known printing methods, for example screen or flexographic printing, or by laser or ink-jet printing. In a preferred embodiment of the invention a portion of the label receptive surface area is reserved for writing on by the user. The user writes-in variable customized information to the reserved area of the label. The reserved areas of the label can be hand written with, for example, ink or pencil. Where pencil written information is to be added the receiving layer should have a pencil receptive surface. Suitable matte finishing additives which facilitate pencil writing include finely particulate inorganic products such as silica, aluminum silicate, alumina and pigments such as titanium dioxide. A particularly preferred matte-finishing agent for use with polyester substrates is titanium dioxide.

Figure 6:
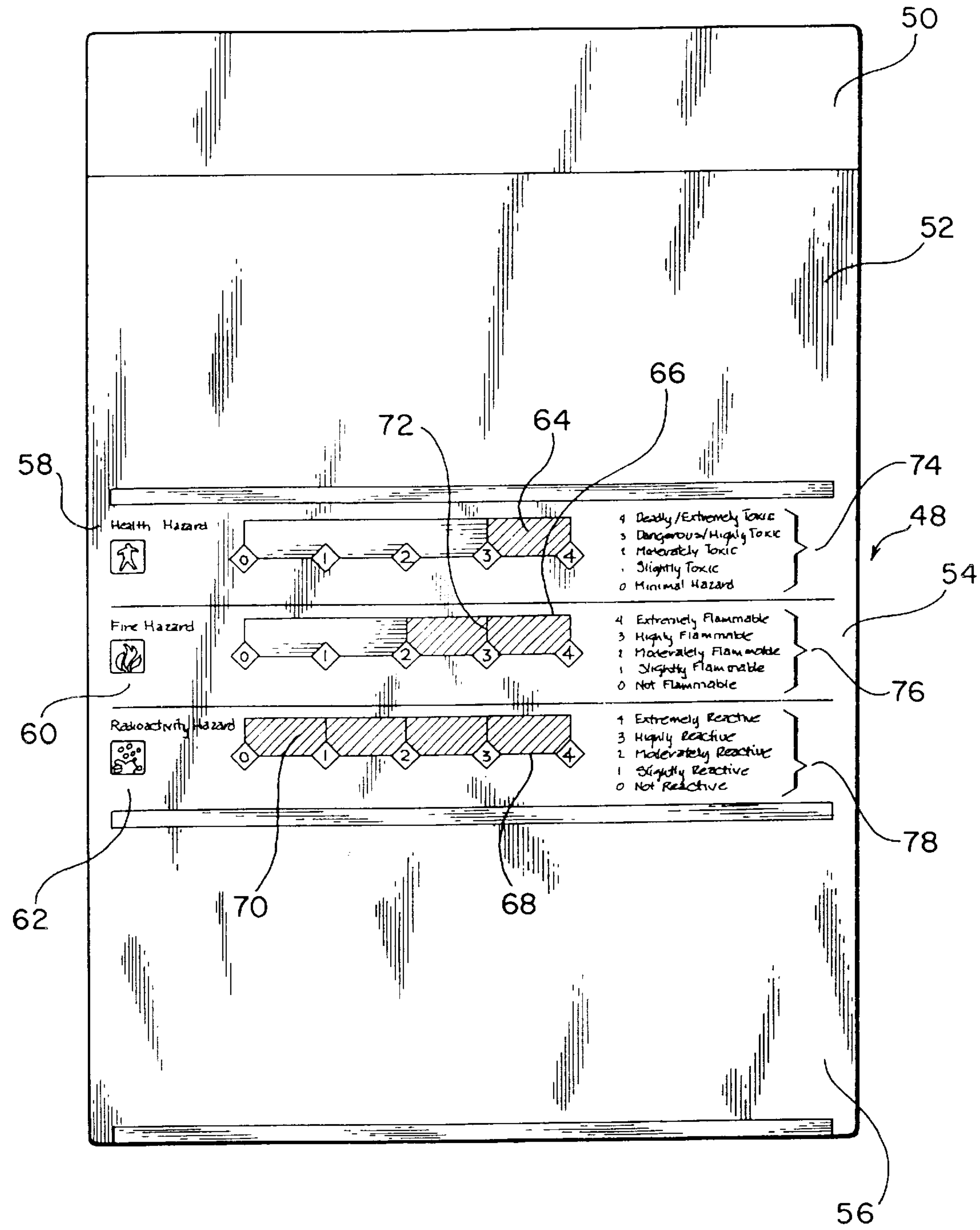
FIG. 6 is an illustration of the color coded surface of a warning label, and removal of the backing.

Referring to FIG. 6, there is shown a printed surface 48 of a warning label of the invention for use with a hazardous chemical. The surface 48 is provided with separate data areas, 50, 52, 54, 56 for displaying printed and/or written instructions and for displaying symbols or coded information. In a preferred embodiment the data area 54 is reserved for display of the color code system of the invention, the data area 50 is reserved for the chemical name and CAS Registry Number, the data areas 52 and 56 are designated for other useful information, for example, Material Safety Data Sheet (MSDS) information, personal protection instructions, first aid instructions, emergency phone numbers, emergency procedures, company name and address and the like. Each section of the label is preferably linked to a corresponding MSDS section. MSDS sheets are now organized into sixteen sections and the format is becoming widely accepted throughout the world. However, it will be apparent that the locations of the information on the label are interchangeable and the content of the instructions can be varied with the application. The identity of the chemical and specific instructions may be hand written or printed on the surface of, for example, data area 50. Additional instructions may be in the form of multiple choice list of hazards accompanied by a box which can be checked-off for each chemical by the user and printed on the surface of, for example, area 52. Emergency procedures may be printed or written on the surface of, for example, area 56.

The label of the invention is designed to provide a user of hazardous chemicals with a means of customizing warning labels with a visual warning that indicates the degree of hazard for a number of different hazards associated with the particular chemical. Such labels are referred to as write-in labels since the specific information is written in on a standard preprinted label.

A standard label of the type described in FIGS. 1, 4 and 6 above is provided in which the label area 54 is reserved for the hazard code and is divided into separate hazard indicating regions for indicating the health 58, the flammability 60, and the reactivity 62 hazards of a chemical in a container to which the label is to be applied. Distinctive colored bars 64, 66, 68 are preprinted in each region and, preferably, each bar is of a different color. Each colored bar is completely covered with a removable opaque coating 70 so that the colored bar is not visible. Each colored bar is divided into four equal segments by transverse lines 72. The person encoding the label has to identify the particular chemical with which the label is to be used and by reference to an appropriate data base(s) determine each of the hazard levels for that material on a scale of 0–4. The encoder of the label erases or scratches off the coating from the appropriate number of segments for each bar starting from the left edge of a bar so that from 0 to 4 colored segments are exposed. If there is no hazard level associated with a particular hazard for the chemical then no colored segments on that bar are exposed.

In a preferred embodiment of the label there is associated with each transverse line of a bar a numeric value selected from the units 0–4. Each unit indicates the number of colored segments exposed by removing the opaque coating from the zero unit to that unit. In one embodiment of the label, for example, the colored bars are read from left to right, the unit 0 is aligned with the left edge of the first segment, the unit 1 is aligned with the right edge of the first segment, the unit 2 is aligned with the right edge of the second segment, the unit 3 is aligned with the right edge of the third segment, and the unit 4 is aligned with the right edge of the fourth segment.

As shown for the exemplary label of FIG. 6, in which the blackened portion of the bar represents the exposed colored bar and the white portion of the bar with the diagonal lines represents the opaque coating, the health hazard 58 is level 3, the flammability hazard 60 is level 2 and the reactivity hazard 62 is level zero. As an aid to the user, the hazard indices 74, 76, 78 for each hazard are printed on the label alongside each colored bar. The ratings preferably correspond to a standard set of ratings, for example, the NFPA scale. Special hazard information can be written-in or checked off on the label Preferably, the label is preprinted with colored bars 64, 66, 68 which are then coated with the removable opaque coating 70, for example, by screen printing or flexographically. The coating layer 70 can be a screen ink which is preferably an ink of soft and dry tissues so that scraping can easily peel it off without damaging the underlying printed area. The coating is removable by scraping with a person's nail, a coin, an eraser or the like to reveal the desired number of colored segments for each hazard. A numerical value-from 0 to 4 may be printed in parallel with the colored bar as a further indication of the hazard level When numbers are printed in parallel with the colored bar they are preferably printed in a contrasting color from that of the bar for ease of reading.

The hazard warning labels of the invention can be printed in different sizes. It is preferable that the location and format of the data be presented at the same location, regardless of the size or type of label to avoid confusion by the user.

The color coded warning label of the invention with the removable ink coating is advantageous because the removable coating over the colored code of the label is protected from accidental abrasion by the self-laminating flap before the code is set and after the code is set the remaining coating and other instructions are sealed in and rendered permanent by adhering the flap to the surface of the label. The hazard can be labeled with a highly visible and easy to use colored code. The code is accurate, quickly read, complete, understandable and effective.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A method of indicating a hazard to a user, comprising:

imprinting a label having a substrate having first and second ends and a surface for receiving printing thereon with a color code, the code comprising a plurality of segments;

coating the color code with a removable, opaque layer; and removing the opaque coating layer from at least one segment of the color code to expose the segment;

wherein the number of exposed segments indicates the level of the hazard according to a predetermined hazard index.

2. The method according to claim 1 in which the removable opaque layer is a screen-ink.

3. The method according to claim 1, in which the label further comprises:

a sheet of transparent material having a first portion attached to the substrate at the first end and a second portion free from the substrate at the second end; the second portion of the sheet of transparent material overlying the receiving surface of the substrate. the opaque coating laver and the code;

a layer of adhesive material on a surface of the sheet of transparent material; and a removable protective liner covering the adhesive layer on the sheet of transparent material.

4. The method according to claim 3, further comprising:

removing the protective liner; and pressing the adhesive layer of the sheet of transparent material to the label surface thereby laminating the sheet of transparent material to the label surface,and rendering the code permanent.

5. The method according to claim 1, in which the color code is a segmented colored bar.

6. The method according to claim 5, in which the colored bar comprises four segments.

7. The method according to claim 1, in which the color code comprises a plurality of colored bars, each bar comprising a plurality of colored segments, wherein each colored bar represents a different hazard.

* * * * *